(12) United States Patent
Hou

(10) Patent No.: US 11,665,306 B1
(45) Date of Patent: May 30, 2023

(54) CAMERA DEVICE FOR SHOOTING AT 360-DEGREE ANGLE AND DISPLAYING IMAGES, AND CONTROL SYSTEM

(71) Applicant: MARVEL TECHNOLOGY (CHINA) CO., LIMITED, Shenzhen (CN)

(72) Inventor: Huawei Hou, Shenzhen (CN)

(73) Assignee: MARVEL TECHNOLOGY (CHINA) CO., LIMITED, Shenzhen (CN)

( * ) Notice: Subject to any disclaimer, the term of this patent is extended or adjusted under 35 U.S.C. 154(b) by 0 days.

(21) Appl. No.: 17/989,933

(22) Filed: Nov. 18, 2022

(51) Int. Cl.
*H04N 5/222* (2006.01)
*H04N 5/89* (2006.01)
*H04N 1/12* (2006.01)
*H04N 1/00* (2006.01)

(52) U.S. Cl.
CPC .................................. *H04N 5/222* (2013.01)

(58) Field of Classification Search
CPC .......... H04N 5/222; H04N 5/89; H04N 1/129; H04N 1/1265; H04N 1/00289
USPC .......................................................... 348/40
See application file for complete search history.

(56) References Cited

U.S. PATENT DOCUMENTS

D971,989 S * 12/2022 Lv ................................ D16/215

\* cited by examiner

*Primary Examiner* — Jeffery A Williams
(74) *Attorney, Agent, or Firm* — Daniel M. Cohn; Howard M. Cohn

(57) ABSTRACT

A camera device for shooting at 360-degree angle and displaying images, and a control system are provided. The camera device includes a supporting platform, a supporting spindle, a supporting base, a rotating shooting bracket, and a video display device. The control system includes at least one wireless communication module configured to receive video data or control commands sent by an external control terminal, a storage module configured to store preset video data, and receive and store the video data transmitted from the wireless communication module, and a control module configured to be in communication connection with the wireless communication module, and the storage module. The control module includes an image processing unit and a display processing unit. The image processing unit obtains the video data stored in the storage module and performs analysis processing on the video data to obtain processed video data.

11 Claims, 7 Drawing Sheets

CAMERA DEVICE FOR SHOOTING AT 360-DEGREE ANGLE AND DISPLAYING IMAGES, AND CONTROL SYSTEM

TECHNICAL FIELD

The present disclosure relates to a technical field of photographic camera devices, and in particular to a camera device for shooting at 360-degree angle and displaying images, and a control system.

BACKGROUND

Nowadays, with the development of technologies, photography and videography have become popular, shooting images is no longer a luxury, and selfie is more casual. 360-degree photo booths, also called 360Photobooth, are platforms for 360-degree surround shooting. Compared with ordinary selfies, the 360-degree photo booths have better entertainment experience. Most of users of such products are trendsetters and fashion icons, who have high pursuit and sensitivity to an appearance, a visual impact, and a user experience atmosphere of the products.

However, current 360-degree photo booths merely have a single function, which is poor in appearance and user experience.

SUMMARY

The present disclosure provides a camera device for shooting at 360-degree angle and displaying images, and a control system, to solve above technical problems in the background.

In order to achieve above purpose, the present disclosure provides a camera device for shooting at 360-degree angle and displaying images, including a supporting platform, a supporting spindle, a supporting base, a rotating shooting bracket, and a video display device. The supporting platform includes a supporting element and a tempered glass, the tempered glass is transparent. The supporting element is configured to support the tempered glass, an accommodation area is enclosed by the tempered glass and the supporting element, the video display device is disposed on the accommodation area, a display terminal of the video display device faces the tempered glass.

Furthermore, the video display device is a three-dimensional (3D) holographic fan.

Furthermore, the video display device includes one of a liquid crystal display (LCD), an organic light-emitting diode (OLED) display, and a light-emitting diode (LED) display.

Furthermore, the video display device includes a transparent display.

Furthermore, the video display device is centrally disposed in the accommodation area.

Furthermore, the camera device further includes a first light source and a reflective mirror, the reflective mirror is laid on the accommodation area and is located below the video display device, the tempered glass is a single-sided perspective glass including a translucent surface and a reflective surface, the reflective mirror is disposed opposite to the reflective surface, the first light source is disposed in the accommodation area.

Furthermore, the first light source includes a plurality of point-shaped light-emitting parts, and the first light source is substantially disposed in an annular shape and disposed adjacent to a lower end surface of the tempered glass or edge contour of an upper end surface of the reflective mirror.

Furthermore, the first light source is in a shape of graphics and/or characters.

Furthermore, the supporting platform includes a connecting element, the connecting element is detachably connected to the supporting element, the connecting element is configured to fix the tempered glass, the supporting element includes a supporting ring and a supporting beam, the supporting beam is configured to support the reflective mirror.

Furthermore, the camera device further includes a second light source, the second light source includes a plurality of point-shaped light-emitting parts, the second light source is substantially disposed in an annular shape and is disposed along an outer wall of the connecting element.

Furthermore, the camera device further includes a third light source, a first end of the supporting spindle is connected to the supporting platform, and a second end of the supporting spindle is connected to the supporting base, the third light source includes a plurality of point-shaped light-emitting parts, the third light source is substantially disposed in an annular shape and is disposed along an outer wall of the supporting base, the rotating shooting bracket is rotated around the supporting platform by a driving device.

The present disclosure further provides a control system applied in the camera device for shooting at 360-degree angle and displaying images, including at least one wireless communication module configured to receive video data or control commands sent by an external control terminal, a storage module configured to store preset video data, and receive and store the video data transmitted from the wireless communication module, and a control module configured to be in communication connection with the wireless communication module and the storage module. The control module includes an image processing unit and a display processing unit, the image processing unit obtains the video data stored in the storage module and performs analysis processing on the video data to obtain processed video data, the display processing unit receives the processed video data processed by the image processing unit, and performs display processing on the processed video data, and the processed video data is displayed on a video display device. The control module is configured to control stopping and switching of playing video according to a playback control instruction sent by the external control terminal, wherein the playback control instruction is obtained by the wireless communication module.

Furthermore, the control system includes a cloud server and a streaming module, the cloud server receives a data request instruction for obtaining video data, and the data request instruction is sent by the external control terminal, according to the data request instruction, the cloud server pushes corresponding video data to the wireless communication module by the streaming module.

Furthermore, the control system includes a timing module, the timing module is in communication connection with the wireless communication module, the storage module and the control module, according to a sorting control instruction received by the wireless communication module and sent by the external control terminal, the timing module controls the control module to read the video data stored in the storage module according to a predetermined sequence, duration and speed, and displays the video data on the video display device.

Furthermore, the video display device includes a speaker, the speaker is in communication connection with the control module.

Furthermore, the control system includes a brightness adjustment unit, the wireless communication module receives a brightness control instruction sent by the external control terminal, the brightness adjustment unit controls a display brightness of the video display device according to the brightness control instruction received by the wireless communication module.

Furthermore, the control system includes a state monitoring module, the state monitoring module is in communication connection with the wireless communication module, the control module, the cloud server, and the video display device. The state monitoring module collects state information, the state information includes standby state information of the video display device, display brightness information of the video display device, volume information of the speaker, and real-time display screen information of the video display device. The state monitoring module sends the state information to the external control terminal by the wireless communication module, or sends the status information to the cloud server, the cloud server forwards the state information to the external control terminal.

Compared with the prior art, the camera device and the control system of the present disclosure is capable of playing preset video files, or user-defined video files by the video display device, when users who are located outside the camera device observes the supporting platform by the transparent tempered glass, the users can intuitively see the videos displayed on the video display device, therefore providing a lot of interest for shooting and enriching functions of the camera device for shooting at 360-degree angle.

Figure 1:
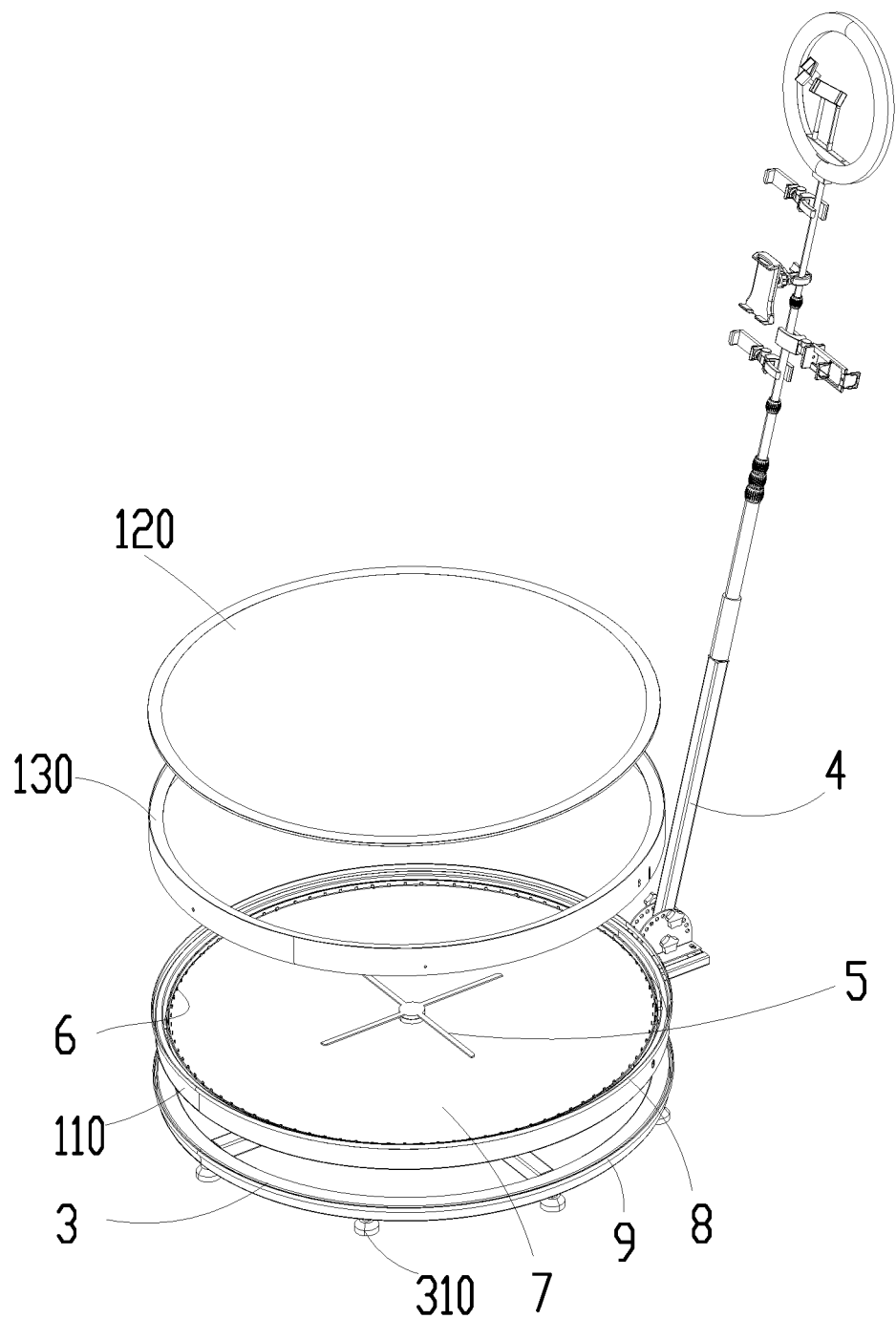
FIG. 1 is a structural schematic diagram of a first embodiment of a camera device for shooting at 360-degree angle and displaying images.

Reference numerals in the drawings: 1: supporting platform; 110: supporting element; 111: supporting ring; 112: supporting beam; 115: accommodation area; 120: tempered glass; 121: translucent surface; 122: reflective surface; 130: connecting element; 2: supporting spindle; 3: supporting base; 310: foot cup; 4: rotating shooting bracket; 5: video display device; 510: brightness adjustment unit; 6: first light source; 7: reflective mirror; 710: first sub-mirror; 720: second sub-mirror; 8: second light source; 9: third light source; 10: driving device; 11: received area; 12: telescopic cylinder; 13: lifting cylinder; 14: wireless communication module; 15: storage module; 16: control module; 161: image processing unit; 162: display processing unit; 17: cloud server; 18: streaming module; 19: timing module; and 20: state monitoring module.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" means "including, but not necessarily limited to"; it specifically indicates open-ended inclusion or membership in a so-described combination, group, series and the like.

Exemplary embodiments of the present disclosure will be described in relation to the accompanying drawings.

FIGS. 1-9 illustrate an exemplary embodiment of a camera device for shooting at 360-degree angle and displaying images. Furthermore, the camera device includes a supporting platform 1, a supporting spindle 2, a supporting base 3, a rotating shooting bracket 4, and a video display device 5. The supporting platform 1 includes a supporting element 110 and a tempered glass 120. The tempered glass 120 is transparent. The supporting element 110 supports the tempered glass 120. An accommodation area 115 is enclosed by the tempered glass 120 and the supporting element 110. The video display device 5 is disposed in the accommodation area 115. A display terminal of the video display device 5 faces the tempered glass 120.

Furthermore, the video display device 5 is configured to play images. The images refer to any one or a combination of still pictures, dynamic pictures, and videos. The video display device 5 is capable of playing preset video files, or user-defined video files. When users located outside the camera device observes the supporting platform 1 by the transparent tempered glass 120, the users may intuitively see the videos displayed on the video display device 5, therefore providing g a lot of interest for shooting and enriching functions of the camera device for shooting at 360-degree angle.

Furthermore, the tempered glass 120 is mainly configured for users to stand. The tempered glass 120 has a solid support structure, which brings safety and reliability to users when using the camera device. The tempered glass 120 has a transparent and light-transmitting effect, which can transmit the image light played by the video display device 5 to improve users' viewing experience when using the camera device for photography and videography The rotating shooting bracket 4 is controlled by a controller. The controller drives a driving device 10 to realize a circumferential rotation of the rotating shooting bracket 4 around the supporting platform 1. The above-mentioned driving method can be implemented by using existing technical means, which will not be described here. Furthermore, the rotating shooting bracket 4 is configured to connect and install a shooting equipment, such as clamping and erecting the shooting equipment. Furthermore, the shooting equipment includes a mobile phone holding bracket, a camera, a fill light, and other equipment.

First Embodiment

Figure 5:
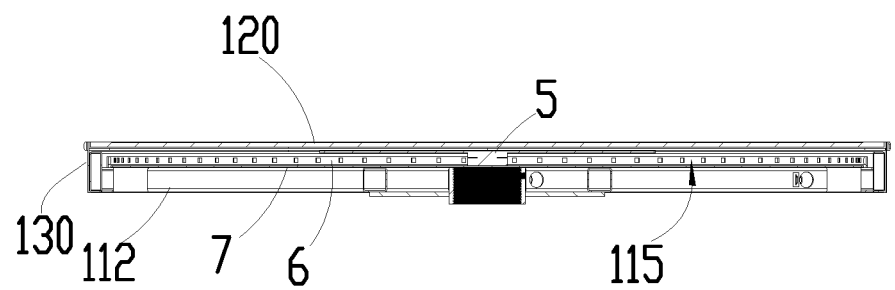
FIG. 5 is a cross-sectional schematic diagram of the supporting platform of the camera device for shooting at 360-degree angle and displaying image.
Figure 6:
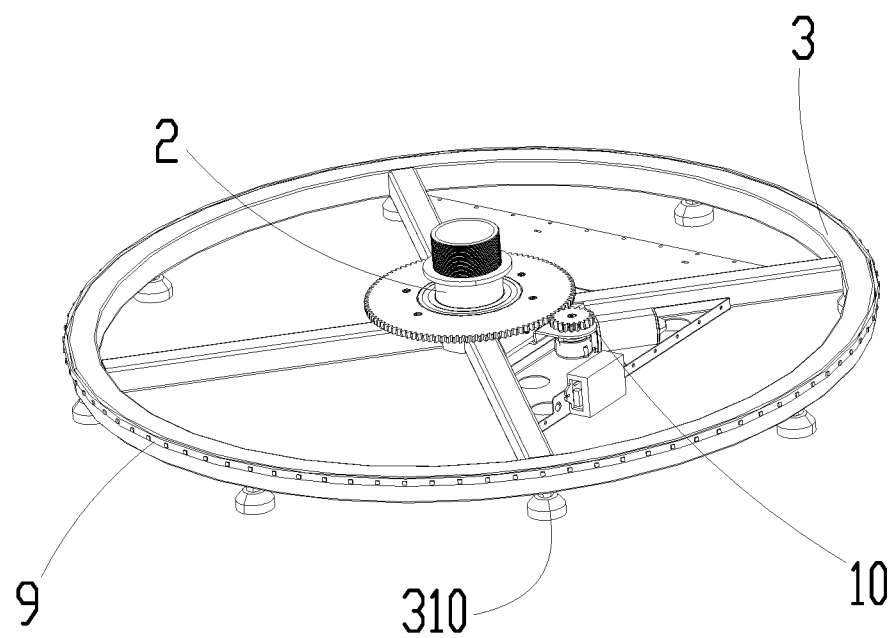
FIG. 6 is a structural schematic diagram of a supporting base, a supporting spindle, a driving device of the camera device for shooting at 360-degree angle and displaying image.
Figure 7:
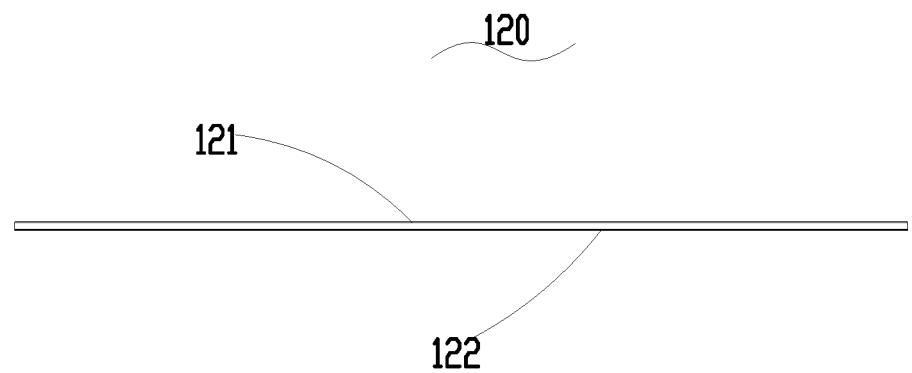
FIG. 7 is a lateral schematic diagram of tempered glass of the camera device for shooting at 360-degree angle and displaying image.
Figure 8:
FIG. 8 is a cross-sectional schematic diagram of a connecting element of the camera device for shooting at 360-degree angle and displaying image.

Referring to FIG. 1 and FIG. 5, the video display device 5 is a three-dimensional (3D) holographic fan.

Furthermore, the 3D holographic fan is a holographic product that realizes a naked-eye 3D experience by a rotation of a fan and a lighting of the LED lamp beads, with a help of a principle of human eye's persistence of vision (POV). By a high-speed rotation of the fan, continuous and complete images are gradually formed. The continuous and complete images have a 3D sense, and a visual effect of the continuous and complete images is very realistic. Since the 3D holographic fan have no borders and backgrounds, it makes users feel that the images displayed on the 3D holographic fan have a magical feeling of three-dimensional floating, which has a cooler experience than traditional displays.

Furthermore, the camera device sets a first light source 6 and a reflective mirror 7. The tempered glass 120 is a single-sided perspective glass. When the first light source 6, the reflective mirror 7, and the tempered glass 120 are combined with a display effect of thousand-layer mirrors, high-speed rotating fan blades of the 3D holographic fan can transmit light, which does not affect the display effect of the thousand-layer mirror.

Second Embodiment

Figure 2:
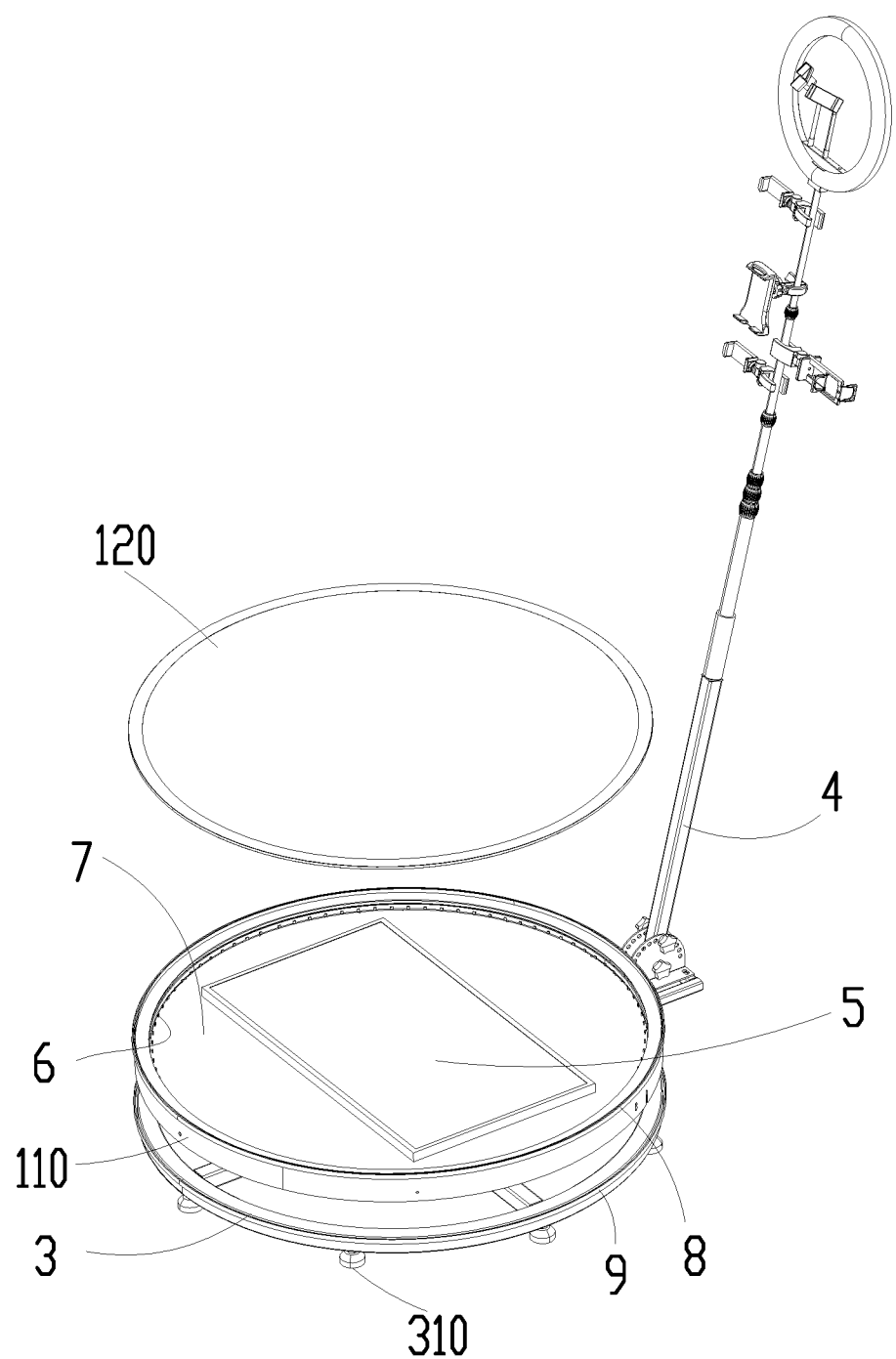
FIG. 2 is a structural schematic diagram of a second embodiment of the camera device for shooting at 360-degree angle and displaying image.

Referring to FIG. 2, the video display device 5 includes any one of a liquid crystal display (LCD), an organic light-emitting diode (OLED) display, and a light-emitting diode (LED) display.

The LED display, the LCD display or the OLED display may play dynamic images, so that the video display device 5 is able to obtain various display effects, thereby providing more interest in use of the camera device.

Referring to FIG. 1 and FIG. 2, preferably, the video display device 5 is centrally disposed in the accommodation area 115.

A centered design that centrally arranging the video display device 5 in the accommodation area 115 is in line with public aesthetics.

Referring to FIG. 1 to FIG. 5, the camera device 1 further includes the first light source 6 and the reflective mirror 7. The reflective mirror 7 is laid on the accommodation area 115 and is located below the video display device 5. The tempered glass 120 is a single-sided perspective glass including a translucent surface 121 and a reflective surface 122. The reflective mirror 7 is disposed opposite to the reflective surface 122. The first light source 6 is disposed in the accommodation area 115.

When the first light source 6 is turned on and emits light, since the first light source 6 is disposed in the accommodation area 115, and is located between the reflective surface 122 of the tempered glass 120 and the reflective mirror 7, the light of the first light source 6 is refracted by the reflective mirror 7 and the reflective surface 122. The light of the first light source 6 is reflected layer by layer, making the user located outside the camera device see the visual effect of cool and personalized multi-layer light gradually disappearing when user observes the supporting platform 1 by the translucent surface 121 of the tempered glass 120. A lot of interest is provided for shooting images by the camera device.

Furthermore, the tempered glass 120 has an effect of transparency and light transmission. The tempered glass 120 can be a single-sided perspective glass, which is also called a two-way mirror. One side of the tempered glass 120 is able to reflect most of projected light back, which can achieve an effect of a single-sided perspective. The effect of the single-sided perspective is that the translucent surface 121 cannot be seen on the reflective surface 122, and the reflective surface 122 can be seen on the translucent surface 121. The tempered glass 120 with the effect of the single-sided perspective is matched with the reflective mirror 7 and the first light source 6, so that the light of the first light source 6 has an infinitely extending tunnel and an effect of getting further and further away, therefore enhancing an atmosphere experience for user using the camera device, mobilizing the user's excitement, and improving viewing degree of using the camera device.

The above lighting effect can also make user visually feel an overall heaviness of the supporting platform 1, making user psychologically feel that the camera device is highly safe and reliable.

Furthermore, an area of the tempered glass 120 and the reflective mirror 7, and a distance between the tempered glass 120 and the reflective mirror 7, determine a number of layers of the reflective mirror 7 and the reflecting surface 122 reflecting the light of the first light source 6. The distance between the tempered glass 120 and the reflective mirror 7 is a longitudinal space of the accommodating area 115.

Furthermore, the first light source 6 includes a point-shaped light source with lamp beads, or a hidden light source without lamp beads.

Third Embodiment

Figure 3:
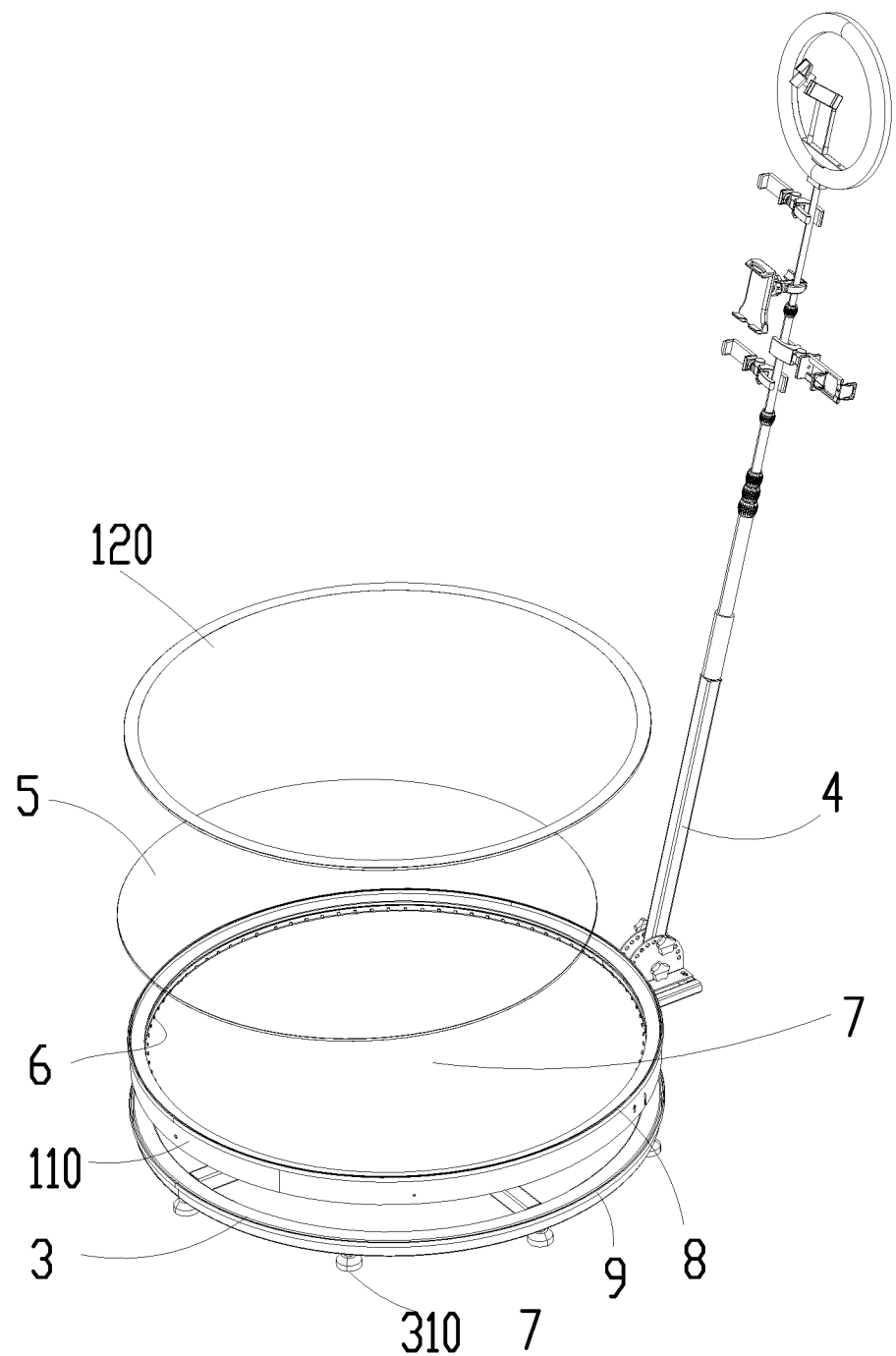
FIG. 3 is a structural schematic diagram of a third embodiment of the camera device for shooting at 360-degree angle and displaying image.

Referring to FIG. 3, the video display device 5 includes a transparent display.

Furthermore, the transparent display is the display screen when the transparent display is used, and the transparent display is the transparent glass when the transparent display is not used. When user uses the display effect of the thousand-layer mirrors, the reflection of light between the reflective mirror 7 and the reflective surface 122 is not affected because of the transparent display not working. When the transparent display and the first light source 6 work together, some areas of the images displayed on the transparent display transmit light, which may not affect the reflection of the light between the reflective mirror 7 and the reflective surface 122.

Referring to FIG. 1-FIG. 3, and FIG. 5, the first light source 6 includes a number of point-shaped light-emitting parts, and the first light source 6 is substantially disposed in an annular shape and disposed adjacent to a lower end surface of the tempered glass 120 or an edge contour of an upper end surface of the reflective mirror 7.

Furthermore, the number of light-emitting parts are LED or OLED lamp beads, which are configured as point light sources. After the first light source 6 is powered on, the number of the LED or OLED lamp beads emit light at the same time, and the light are refracted together by the reflective surface 122 of the tempered glass 120 and the reflective mirror 7, and the light emit by the point light sources are reflected layer by layer, and the gradual disappearing effect of cool and personalized multi-layer light can be seen intuitively.

Furthermore, as the first light source 6 is in the annular shape, a ring-shaped atmosphere of the first light source 6 is formed to emit light, which makes users feel fantastic atmosphere effect with cool visual impact and infinite illusion and feel that dots of light seem to recede to infinity, therefore creating a deep light tunnel effect with a fantastic atmosphere experience.

Furthermore, the first light source 6 is in a shape of graphics and/or characters.

Furthermore, the first light source 6 has a shape of graphics. The shape of graphics includes, but is not limited to a star, a circle, a wavy line.

Referring to FIGS. 1-3, the supporting platform 1 includes a connecting element 130. The connecting element 130 is detachably connected to the supporting element 110. The connecting element 130 fixes the tempered glass 120. The supporting element 110 includes a supporting ring 111 and a supporting beam 112. The supporting beam 112 supports the reflective mirror 7.

Furthermore, a cross-section of the connecting element 130 is substantially in an inverted "T" shape. Two extension ends of the connecting element 130 are in contact with the supporting ring 111 and the tempered glass 120 respectively. The connecting element 130 and the supporting ring 111 respectively include connecting holes. The connecting holes of the connecting element 130 and the supporting ring 111 can be penetrated by screws to fasten the connecting piece 130 to connect to the supporting ring 111. The connecting element 130 supports an edge part of the tempered glass 120. The connecting element 130 is connected to the tempered glass 120 by a mean of the connecting element 130 is glued to the tempered glass 120 or a mean of the connecting element 130 being integral with the tempered glass 120. The connecting element 130 also plays a role of edge wrapping decoration to a certain extent.

Fourth Embodiment

Figure 9:
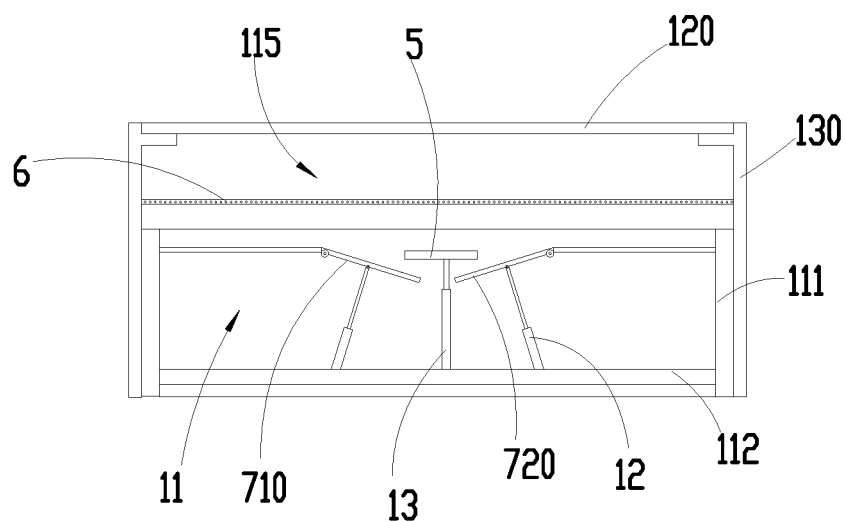
FIG. 9 is a structural schematic diagram of a fourth embodiment of the camera device for shooting at 360-degree angle and displaying image.
Figure 10:
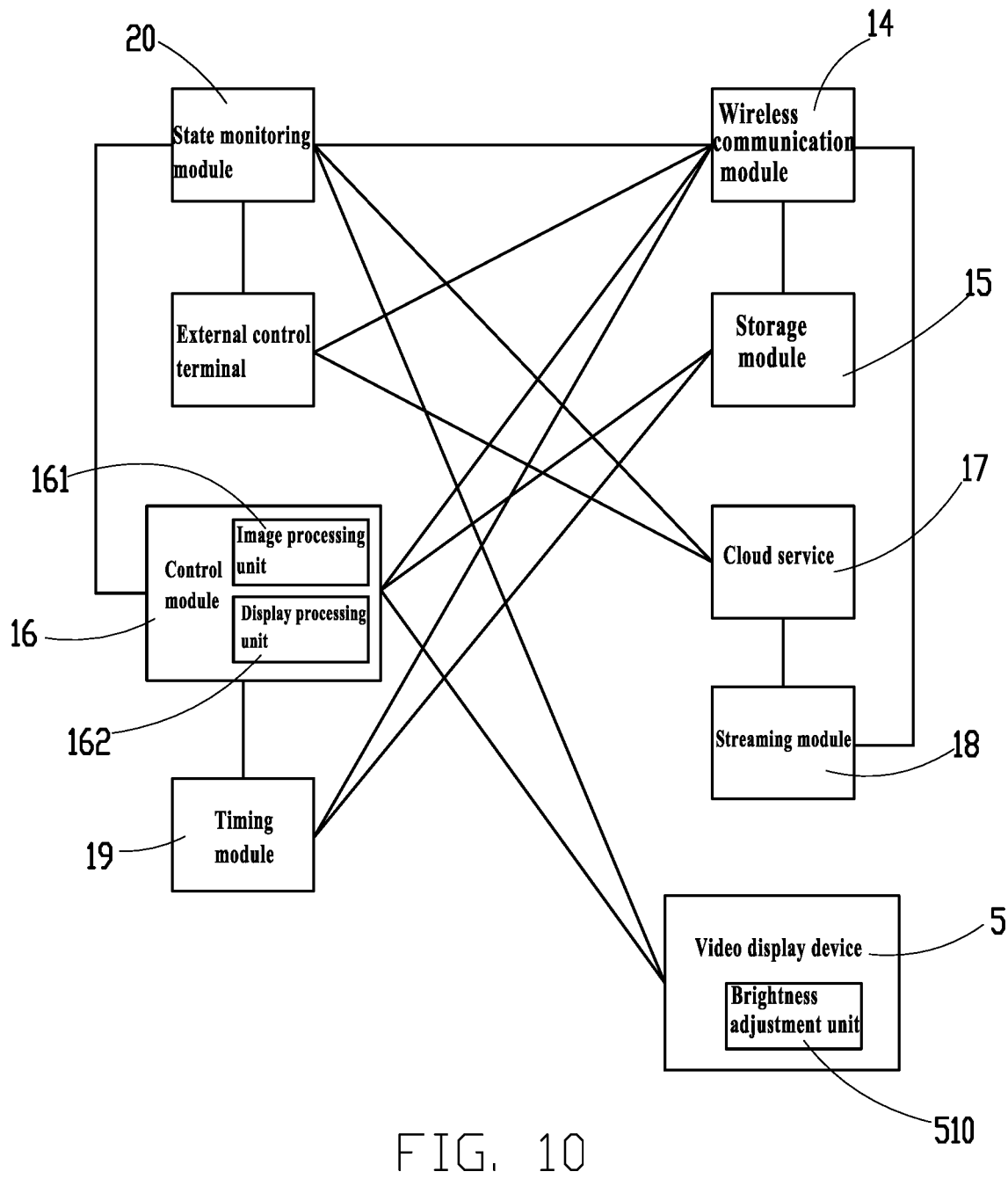
FIG. 10 is a block diagram illustrating a control system including modules connected to each other.

Referring to FIG. 9, a received area 11 is enclosed between a lower end surface of the reflective mirror 7 and the supporting beam 112. The reflective mirror 7 includes a first sub-mirror 710 and a second sub-mirror 720. One end of the first sub-mirror 710 and one end of the second sub-mirror 720 are pivotally connected to the supporting ring 111. The other end of the first sub-mirror 710 and the other end of the second sub-mirror 720 are rotatably connected to a telescopic cylinder 12. A lifting cylinder 13 is disposed in the received area 11, and the lifting cylinder 13 connects to the video display device 5. When the telescopic cylinder 12 drives the first sub-mirror 710 and the second sub-mirror 720 to rotate and separates the first sub-mirror 710 and the second sub-mirror 720, the lifting cylinder 13 drives the video display device 5 to move between the received area 11 and the accommodation area 115. When the telescopic cylinder 12 drives the first sub-mirror 710 and the second sub-mirror 720 to rotate and aligns the first sub-mirror 710 and the second sub-mirror 720, the first sub-mirror 710 and the second sub-mirror 720 are combined into a flat reflective mirror 7. By above embodiment, when the video display device 5 is an ordinary LCD display OLED display screen, the lifting cylinder 13 drives the video display device 5 to move into or out of the accommodation area 115, realizing modes of the video display device 5 working together with the first light source 6, the video display device 5 working alone, and the first light source 6 working alone.

Figure 4:
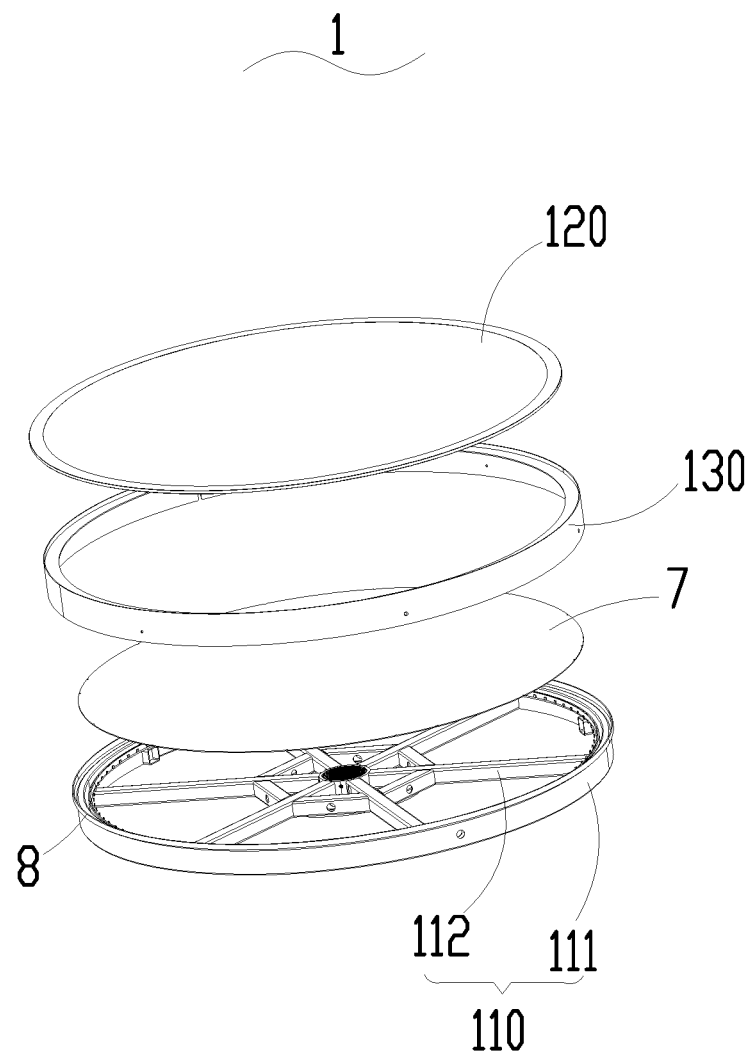
FIG. 4 is an exploded structural schematic diagram of a supporting platform of the camera device for shooting at 360-degree angle and displaying image.

Referring to FIG. 4, the camera device further includes a second light source 8. The second light source 8 includes a number of point-shaped light-emitting parts. The second light source 8 is substantially disposed in an annular shape and is disposed along an outer wall of the connecting element 130.

Furthermore, the second light source 8 plays a decorative role on an outer periphery of the supporting platform 1.

Referring to FIGS. 1-3, the camera device further includes a third light source 9. A first end of the supporting spindle 2 is connected to the supporting platform 1, and a second end of the supporting spindle 2 is connected to the supporting base 3. The third light source 9 includes a number of point-shaped light-emitting parts. The third light source 9 is substantially disposed in an annular shape and is disposed along an outer wall of the supporting base 3. The rotating shooting bracket 4 is rotated around the supporting platform 1 by the driving device 10.

The third light source 9 decorates the supporting base 3. The supporting base 3 plays a role of ground support for the supporting platform 1 by the supporting spindle 2.

The camera device includes a power supply system (not shown in the drawings). The power supply system supplies power to the driving device 10, the first light source 6, the second light source 8, the third light source 9, the video display device 5, and other modules of the camera device.

Furthermore, a foot cup 310 is disposed at a bottom of the supporting base 3. A high of the foot cup 310 is adjustable.

In one embodiment, the first light source 6, the second light source 8, and the third light source 9 can be color Red, Green, Blue (RGB) LED light strips, RGBW light strips and other types of light strips. The color RGB LED light strips or the RGBW light strips have bright colors, a durability, a long life, a good use effect, and a good decorative effect. Under a control of a controller, the first light source 6, the second light source 8, and the third light source 9 are able to realize sequential transformation and flickering, jumping and gradient effects of various colors, by which, various light effects such as horse racing, running water, meteor trailing, scanning, etc. have been realized to form a diverse annular atmosphere, therefore making users experience a fantastic atmosphere effect and a cool visual impact.

Referring to FIGS. 1-3, and 10, a control system is illustrated. The control system is applied in the camera device as described above. The control system includes one or more wireless communication modules 14, a storage module 15 and a control module 16. The one or more wireless communication modules 14 receives video data or control commands sent by an external control terminal.

The storage module 15 stores preset video data, and receives and stores the video data transmitted from the wireless communication module 14.

The control module 16 is in communication connection with the wireless communication module 14 and the storage module 15. The control module 16 includes an image processing unit 161 and a display processing unit 162. The image processing unit 161 obtains the video data stored in the storage module 15 and performs analysis processing on the video data to obtain processed video data. The display processing unit 162 receives the processed video data processed by the image processing unit 161, and performs display processing on the processed video data, and the processed video data is displayed on the video display device 5.

In one embodiment, the external control terminal is a software installed on any device such as a personal computer (PC), a tablet computer and a mobile phone. The external control terminal establishes a communication connection with the wireless communication module 14 by a Wireless Fidelity (WIFI) module and/or a Bluetooth module for data transmission. The external control terminal sends a playback control instruction to the wireless communication module 14. The control module 16 obtains the preset video data reserved by the user and stored in the storage module 15, and displays the preset video data on the video display device 5. The control module 16 combines with a rotation control function of the rotating shooting bracket 4, and a combination between the control module 16 and the rotation control function of the rotating shooting bracket 4 is able to produce a linkage effect and enrich use experience.

The control module 16 further controls the video display device 5 to stop playing video or switch video according to the playback control instruction sent by the external control terminal. The control module 16 obtains the playback control instruction by the wireless communication module 14.

Furthermore, the external control terminal further sends instructions for stopping, playing, and switching playback content to the camera device for user-defined operations.

Referring to FIGS. 1-3, and 10, the control system includes a cloud server 17 and a streaming module 18. The cloud server 17 receives a data request instruction for obtaining video data, and the data request instruction is sent by the external control terminal. According to the data request instruction, the cloud server 17 pushes corresponding video data to the wireless communication module 14 by the streaming module 18.

By the cloud server 17 storing one or more preset program contents of the video data that can be downloaded and played, and the external control terminal sending the data request instruction for obtaining video data, the wireless communication module 14 receives and downloads the video data pushed by the streaming module 18, and presents the video data to the video display device 5 for display and playback. The wireless communication module 14 includes, but is not limited to, a WIFI module. The WIFI module is communicated to the Internet by a wireless router, and then communicates with the cloud server 17. Furthermore, the wireless communication module 14 can be a 3G/4G/5GeSIM module. The 3G/4G/5GeSIM module communicates with the cloud server 17 by a cellular network base station.

Referring to FIGS. 1-3, and 10, the control system includes a timing module 19. The timing module 19 is in communication connection with the wireless communication module 14, the storage module 15 and the control module 16. According to a sorting control instruction received by the wireless communication module 14 and sent by the external control terminal, the timing module 19 controls the control module 16 to read the video data stored in the storage module 15 according to a predetermined sequence, duration and speed, and displays the video data on the video display device 5.

By the timing module 19, the user can customize the content of the video data for displaying repeatedly the content of the video data five times, multiple playback contents of the video data can be set, and different contents of the video data can be set to play in different scenes, the camera device can be set to display specified content of the video data content before or after the camera device booting, the camera device can be set to display different contents of the video data under different rotation speeds of the rotating shooting bracket 4.

Furthermore, the video display device 5 includes a speaker (not shown in the drawings). The speaker in communication connection with the control module 16.

The wireless communication module 14 receives a volume control instruction sent by the external control terminal. The control module 16 controls a driving module of the video display device 5 to regulate a volume of the speaker according to the volume control instruction.

Referring to FIGS. 1-3, and 10, the control system includes a brightness adjustment unit 510. The wireless communication module 14 receives a brightness control instruction sent by the external control terminal. The brightness adjustment unit 510 controls a display brightness of the video display device 5 according to the brightness control instruction received by the wireless communication module 14.

Referring to FIGS. 1-3, and 10, the control system includes a state monitoring module 20. The state monitoring module 20 communicates with the wireless communication module 14, the control module 16, the cloud server 17, and the video display device 5. The state monitoring module 20 collects state information of the camera device. The state information includes standby state information of the video display device 5, display brightness information of the video display device 5, volume information of the speaker, and real-time display screen information of the video display device 5. The state monitoring module 20 sends the state information to the external control terminal by the wireless communication module 14, or sends the status information to the cloud server 17. The cloud server 17 forwards the state information to the external control terminal.

The standby state information of the video display device 5 is used to display an on state or an off state of the video display device 5. After the state information is obtained by the user's external control terminal, relevant information can be learned and corresponding regulation can be carried out.

What is claimed is:

1. A camera device for shooting at 360-degree angle and displaying images comprising:
    a supporting platform;
    a supporting spindle;
    a supporting base;
    a rotating shooting bracket; and
    a video display device;
    wherein the supporting platform comprises a supporting element and a tempered glass, the tempered glass is transparent, the supporting element is configured to support the tempered glass, an accommodation area is enclosed by the tempered glass and the supporting element; the video display device is disposed on the accommodation area, and a display terminal of the video display device faces the tempered glass.

2. The camera device for shooting at 360-degree angle and displaying images as recited in claim 1, wherein the video display device is a three-dimensional (3D) holographic fan.

3. The camera device for shooting at 360-degree angle and displaying images as recited in claim 1, wherein the video display device comprises one of a liquid crystal display (LCD), an organic light-emitting diode (OLED) display, and a light-emitting diode (LED) display.

4. The camera device for shooting at 360-degree angle and displaying images as recited in claim 1, wherein the video display device comprises a transparent display.

5. The camera device for shooting at 360-degree angle and displaying images as recited in claim 1, wherein the video display device is centrally disposed in the accommodation area.

6. The camera device for shooting at 360-degree angle and displaying images as recited in claim 1, wherein the camera device further comprises a first light source and a reflective mirror, the reflective mirror is laid on the accommodation area and is located below the video display device; the tempered glass is a single-sided perspective glass comprising a translucent surface and a reflective surface; the reflective mirror is arranged opposite to the reflective surface, the first light source is disposed in the accommodation area.

7. The camera device for shooting at 360-degree angle and displaying images as recited in claim 6, wherein the first light source comprises a plurality of point-shaped light-emitting parts, and the first light source is substantially disposed in an annular shape and disposed adjacent to a lower end surface of the tempered glass or edge contour of an upper end surface of the reflective mirror.

8. The camera device for shooting at 360-degree angle and displaying images as recited in claim 6, wherein the first light source is in a shape of graphics and/or characters.

9. The camera device for shooting at 360-degree angle and displaying images as recited in claim 6, wherein the supporting platform comprises a connecting element, the connecting element is detachably connected to the supporting element, the connecting element is configured to fix the tempered glass; the supporting element comprises a supporting ring and a supporting beam, the supporting beam is configured to support the reflective mirror.

10. The camera device for shooting at 360-degree angle and displaying images as recited in claim 9, wherein the camera device further comprises a second light source, the second light source comprises a plurality of point-shaped light-emitting parts, the second light source is substantially disposed in an annular shape and is disposed along an outer wall of the connecting element.

11. The camera device for shooting at 360-degree angle and displaying images as recited in claim 1, wherein the camera device further comprise a third light source, a first end of the supporting spindle is connected to the supporting platform, and a second end of the supporting spindle is connected to the supporting base; the third light source comprises a plurality of point-shaped light-emitting parts, the third light source is substantially disposed in an annular shape and is disposed along an outer wall of the supporting base, the rotating shooting bracket is rotated around the supporting platform by a driving device.

* * * * *